United States Patent
Pieper

(10) Patent No.: US 6,779,371 B1
(45) Date of Patent: Aug. 24, 2004

(54) STEERING COLUMN LOCK FOR MOTOR VEHICLES

(75) Inventor: Friedrich Pieper, Töging (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 10/469,641

(22) PCT Filed: Mar. 14, 2002

(86) PCT No.: PCT/EP02/02843

§ 371 (c)(1),
(2), (4) Date: Sep. 3, 2003

(87) PCT Pub. No.: WO02/085678

PCT Pub. Date: Oct. 31, 2002

(30) Foreign Application Priority Data

Apr. 20, 2001 (DE) .......................................... 101 19 267

(51) Int. Cl.[7] .............................. B60R 25/02; G05G 5/00
(52) U.S. Cl. .............................. 70/186; 70/252; 70/182
(58) Field of Search ........................... 70/182–186, 252

(56) References Cited

U.S. PATENT DOCUMENTS

| | | | | |
|---|---|---|---|---|
| 3,940,958 A | * | 3/1976 | Kuroki .......................... | 70/186 |
| 5,036,686 A | * | 8/1991 | Ichinose ....................... | 70/186 |
| 6,003,349 A | * | 12/1999 | Nagae et al. .................. | 70/186 |
| 6,237,378 B1 | * | 5/2001 | Canard .......................... | 70/252 |
| 6,442,985 B1 | * | 9/2002 | Watanuki et al. .............. | 70/186 |
| 6,467,319 B1 | * | 10/2002 | Karasik et al. ................ | 70/186 |
| 6,539,756 B2 | * | 4/2003 | Bartels et al. ................. | 70/186 |

FOREIGN PATENT DOCUMENTS

| | | |
|---|---|---|
| DE | 2322330 | 11/1974 |
| GB | 2346354 | 8/2000 |
| WO | WO 93/13967 | * 7/1993 |

* cited by examiner

*Primary Examiner*—John B. Walsh
(74) *Attorney, Agent, or Firm*—Friedrich Kueffner

(57) ABSTRACT

The aim of the invention is to provide a steering column lock with improved break-up safety. To this end, a spring-loaded locking pin (30) is integrated into the peripheral cam (12), said locking pin being co-rotated when a rotor (10) pertaining to the steering column lock is rotated. In the test position (30.1) of the locking pin (30), the pin is aligned with a locking recess (38) in the housing (1) while in a working position of the motor (10) that is obtained by access authorization means, it is not. Normally, the locking pin (30) is inactive since it is maintained in a retracted position by a spring-loaded (47) feeler (40). When the rotor (10) is missing, the feeler (40), due to its spring load (27), releases the locking pin (30). If in this case the rotor (10) is in the rest position, the locking pin (30) engages in the locking recess (38) of the housing (11) and blocks rotation. In a working position of the rotor (10), rotation is not blocked, thereby allowing authorized persons disposing of the access authorization means to mount or dismount the rotor (10).

9 Claims, 7 Drawing Sheets

STEERING COLUMN LOCK FOR MOTOR VEHICLES

The invention pertains to a steering column lock of the type indicated in the introductory clause of Claim 1. In an unmoving vehicle, a locking bar for the steering column is in its locking position, with the result that the steering column cannot be turned. When an unauthorized person tries to tear the rotor out of the steering column lock, an anti-theft device is activated. The anti-theft device consists of a spring-loaded locking pin and a securing element, which cooperates with the pin. When the steering column lock is broken open, the securing element releases the spring-loaded locking pin, which then moves into its extended position and blocks the locking bar. Even though the rotor has been torn out, the unauthorized person cannot move the locking bar into the releasing position. The vehicle is thus theft-proof.

In the known device of this type (EP 0 806 328 A2), the securing element consists of a sheet-metal strip provided with a predetermined break point; one end of the strip acts on the rotor, whereas the other end has a prong, which grips under a shoulder on the locking pin. When the rotor is torn out, the sheet-metal strip breaks in two and thus releases the locking pin. The locking pin travels into a recess in a slider in the housing. The slider is connected to the locking bar and moves the locking bar between the locking position and the releasing position by way of the control cam.

This known anti-theft device is susceptible to malfunctions and is thus unreliable. A significant disadvantage is that the known steering column lock can only be delivered with the rotor already installed. In the case of access authorization means that operate mechanically, the rotor consists, for example, of a lock cylinder, which is coded to work with the key assigned to it. When the known steering column locks are delivered, each individual key must be assigned to the steering column belonging to it and must remain thus assigned until the vehicle is delivered. This is very cumbersome. Similar difficulties arise when a defective lock cylinder must later be replaced, whereupon the anti-theft device must be activated again.

The invention is based on the task of developing a reliable steering column lock of the type indicated in the introductory clause of Claim 1 with an anti-theft device, which lock allows authorized parties to install and remove the rotor, but which, after the rotor has been torn out by an unauthorized person, reliably blocks the steering column. These apparently mutually contradictory goals are accomplished according to the invention by the measures cited in Claim 1, to which the following special meaning attaches:

The problem that the invention solves is how to allow an authorized person to perform easily an action such as installing or removing the rotor while at the same time an unauthorized person is prevented from doing so. Only in the latter case should the anti-theft device be activated to prevent manipulations of the locking bar. To solve this problem, the invention makes use of the difference between these two types of persons, this difference being that only the authorized person will have the correct access authorization means which make it possible for him to move the rotor from the home position in the parked vehicle to the working position required for the operation of the vehicle. For this reason, the invention proposes that the spring-loaded locking pin belonging to the anti-theft device be integrated into the components which rotate concomitantly with the rotor as it moves from one position to another. The invention proposes that the control cam be used as the component to accomplish this purpose, even though it would also be possible to use other components which rotate concomitantly with the turning of the rotor. When an unauthorized position tampers with the steering lock of a parked vehicle and removes the rotor, a spring-loaded element ensures that the locking pin in the control cam is released. Because this locking pin is spring-loaded, it will then be able to move into a locking recess in the housing. This has the effect of preventing the control cam from rotating, and thus no further manipulations such as turning the cam, which could have the effect of moving the locking bar out of its locking position into the releasing position, are possible.

The authorized position, i.e., the person with the correct access authorization means in his possession, however, is able to move the rotor into its working position, e.g., into the "drive" position of an ignition switch, which is combined with the steering column lock. As a result, the locking pin in the control cam arrives in a rotational position in which it is supported against an inside surface of the housing, and this makes it possible for the control cam to be turned later by the rotor, after it has been reinstalled. The invention takes advantage of this property to preassemble the steering column locks to form preliminary units without their rotors and to deliver them in this form. Thus it is possible to produce the components very easily and efficiently without the need to take into account the individual access authorization means. These preliminary rotorless steering column products can be manufactured in large quantities, and then, during the final assembly work on the vehicle, for example, they can be provided with their individual rotors and access authorization means, such as keys.

This preliminary steering column product is assembled so that it is in a special "delivery position" according to the invention, which position corresponds to the working position of the control cam which can be reached under normal conditions only by the use of the access authorization means. In this position, as already mentioned above, the spring-loaded locking pin is supported against an inside surface of the housing and, after installation of the rotor, allows the control cam to rotate back to its home position. As a result, it is a very simple matter to produce, to transport, to install, and to repair the steering column locks according to the invention. The paired components according to the invention, i.e., the rotor and the access authorization means, are installed into the previously mentioned separate preliminary steering column lock product only at the last moment. It is also possible to replace a defective rotor at a later time without the need to remove the means used to prevent unauthorized persons from breaking the lock. These anti-theft means always remain intact. The authorized person with the access authorization means does not need to worry about the anti-theft device of the lock at all; he or she will not even notice that such a device is present. The anti-theft device acts reliably only against a thief.

Additional features and advantages of the invention can be derived from the subclaims, from the following description, and from the drawings. The drawings illustrate the invention on the basis of an exemplary embodiment:

Figure 1:
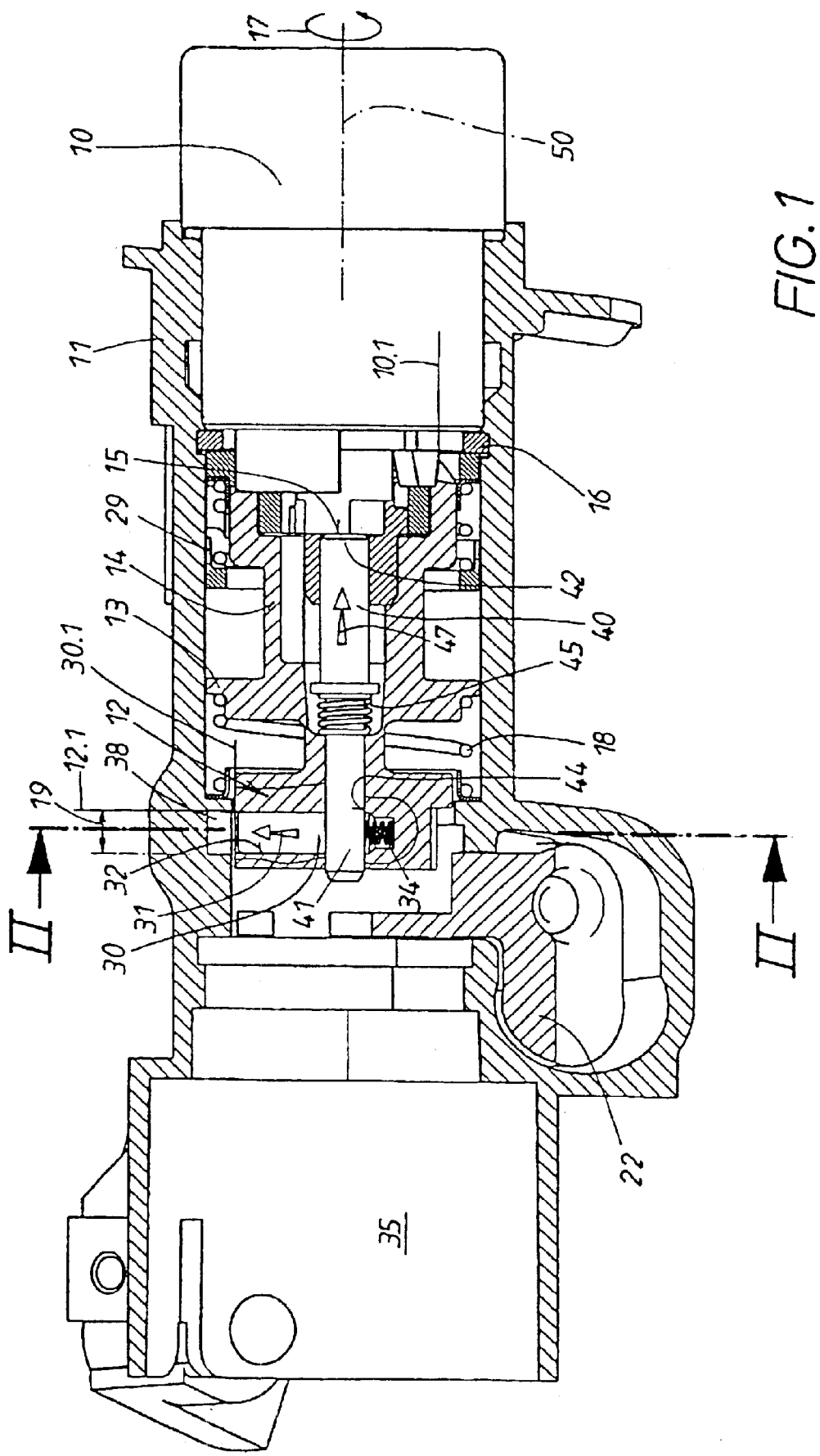
FIG. 1 shows a longitudinal cross section through the steering column lock according to the invention, while the installed rotor is in its home position and after the associated key has been pulled out.
Figure 2:
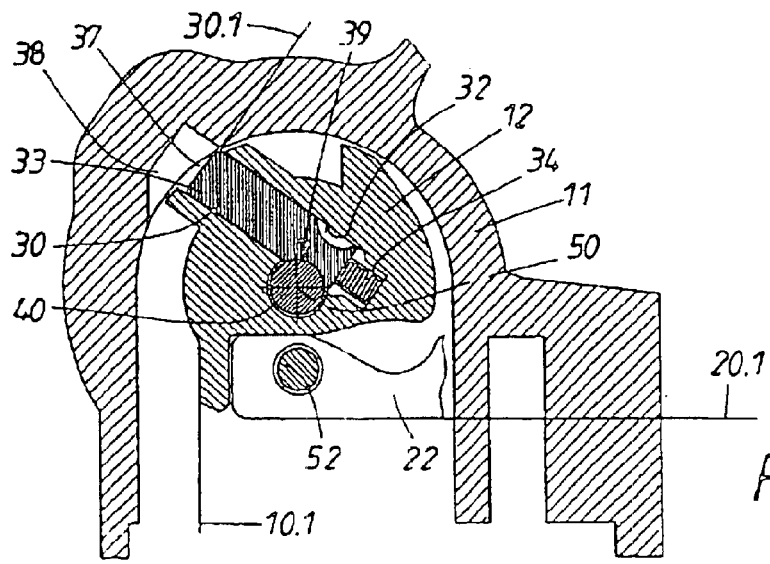
FIG. 2 shows a cross section through the steering column lock of FIG. 1 along cross-sectional line II—II in that figure.
Figure 4:
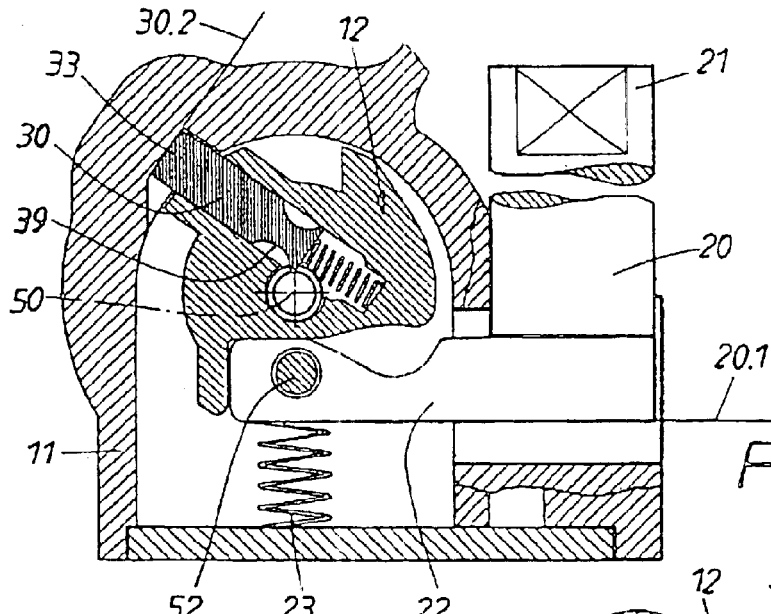
Figure 6:
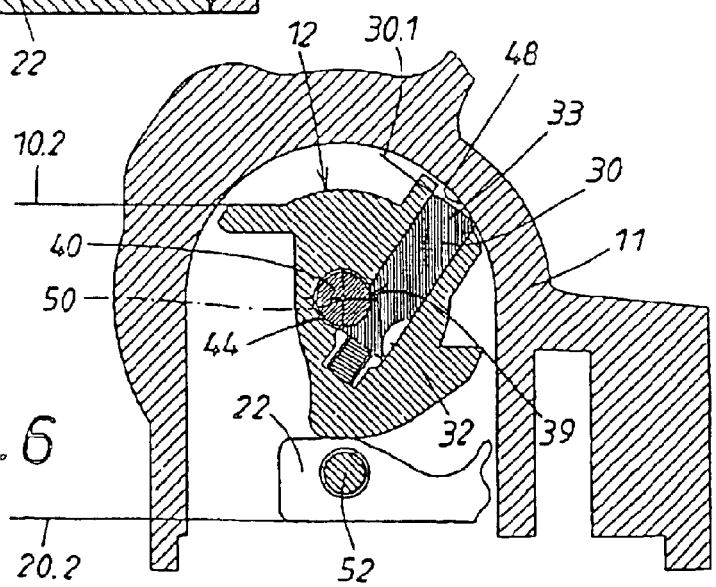
Figure 3:
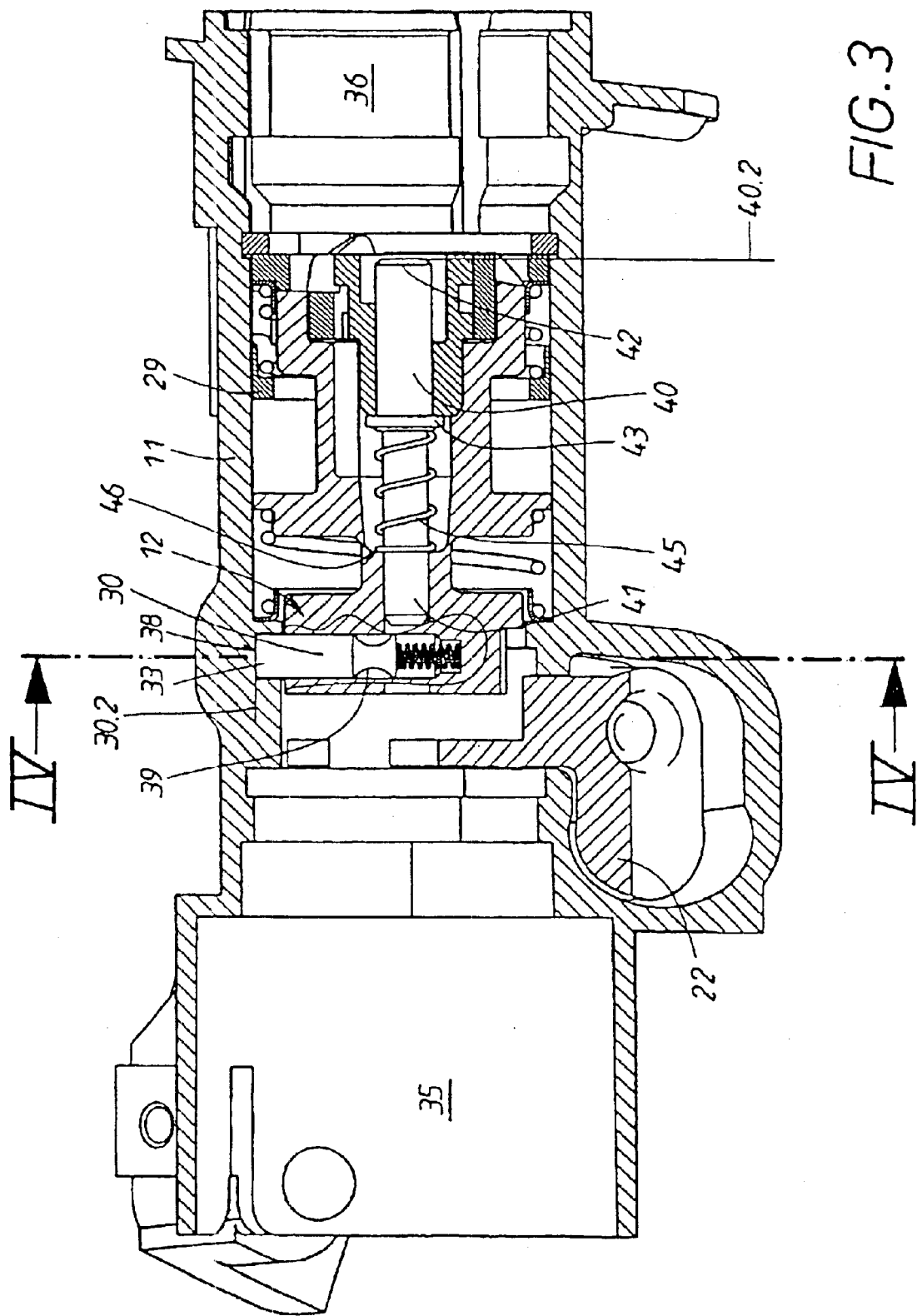
FIG. 3 shows a cross-sectional view corresponding to FIG. 1 of the steering column lock after the rotor has been torn out by an unauthorized person.
Figure 5:
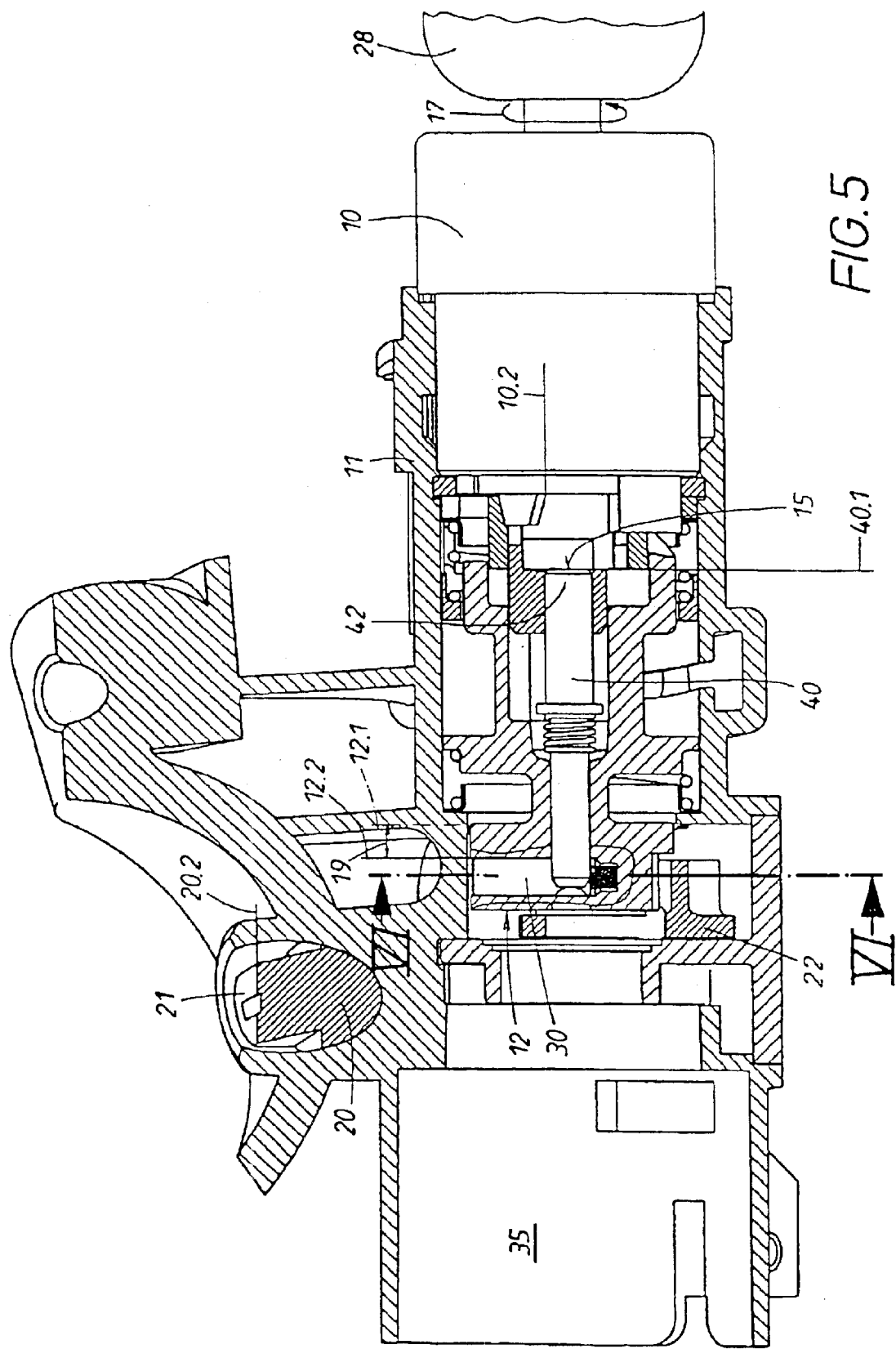
Figure 7:
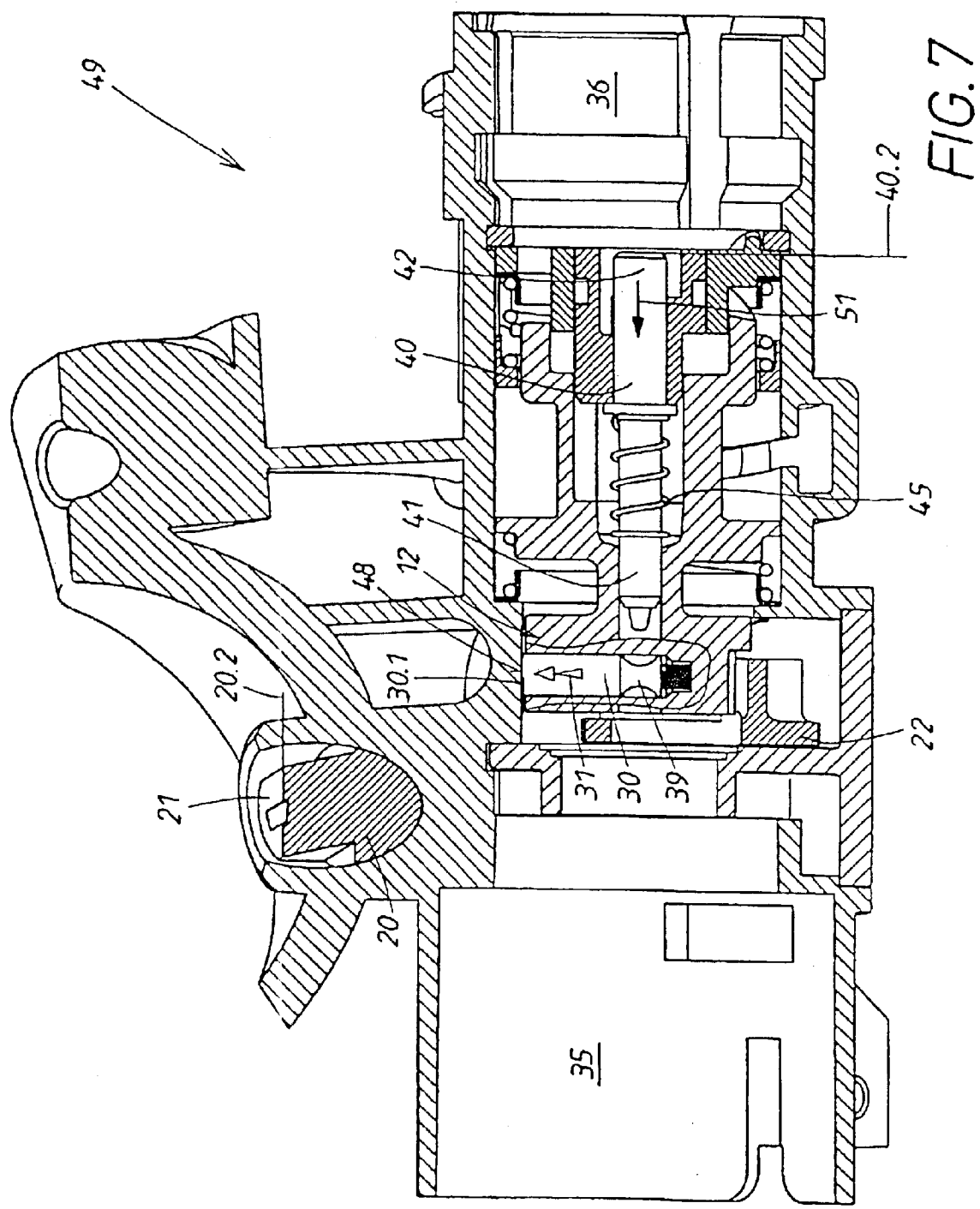
Figure 8:
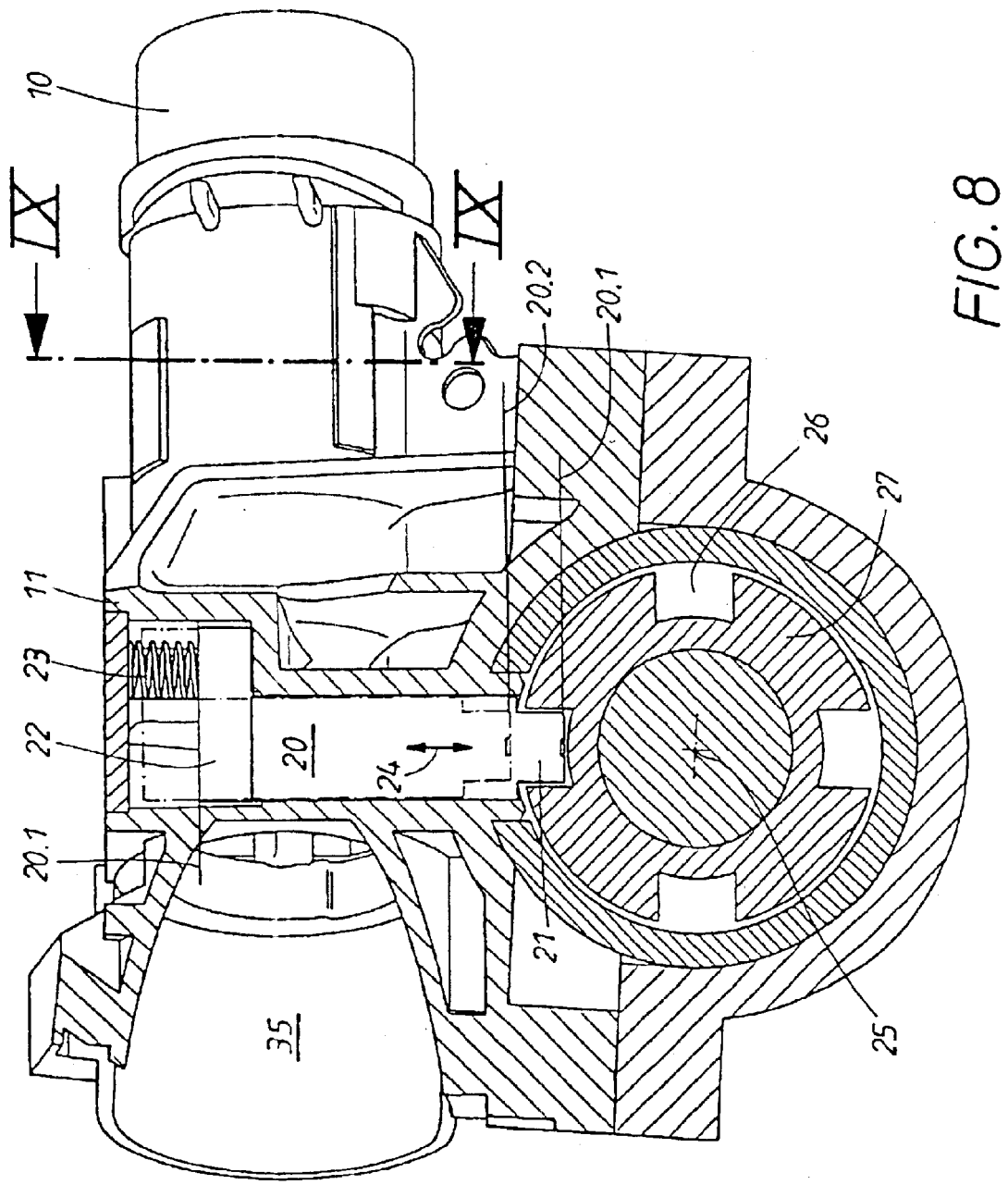
Figure 9:
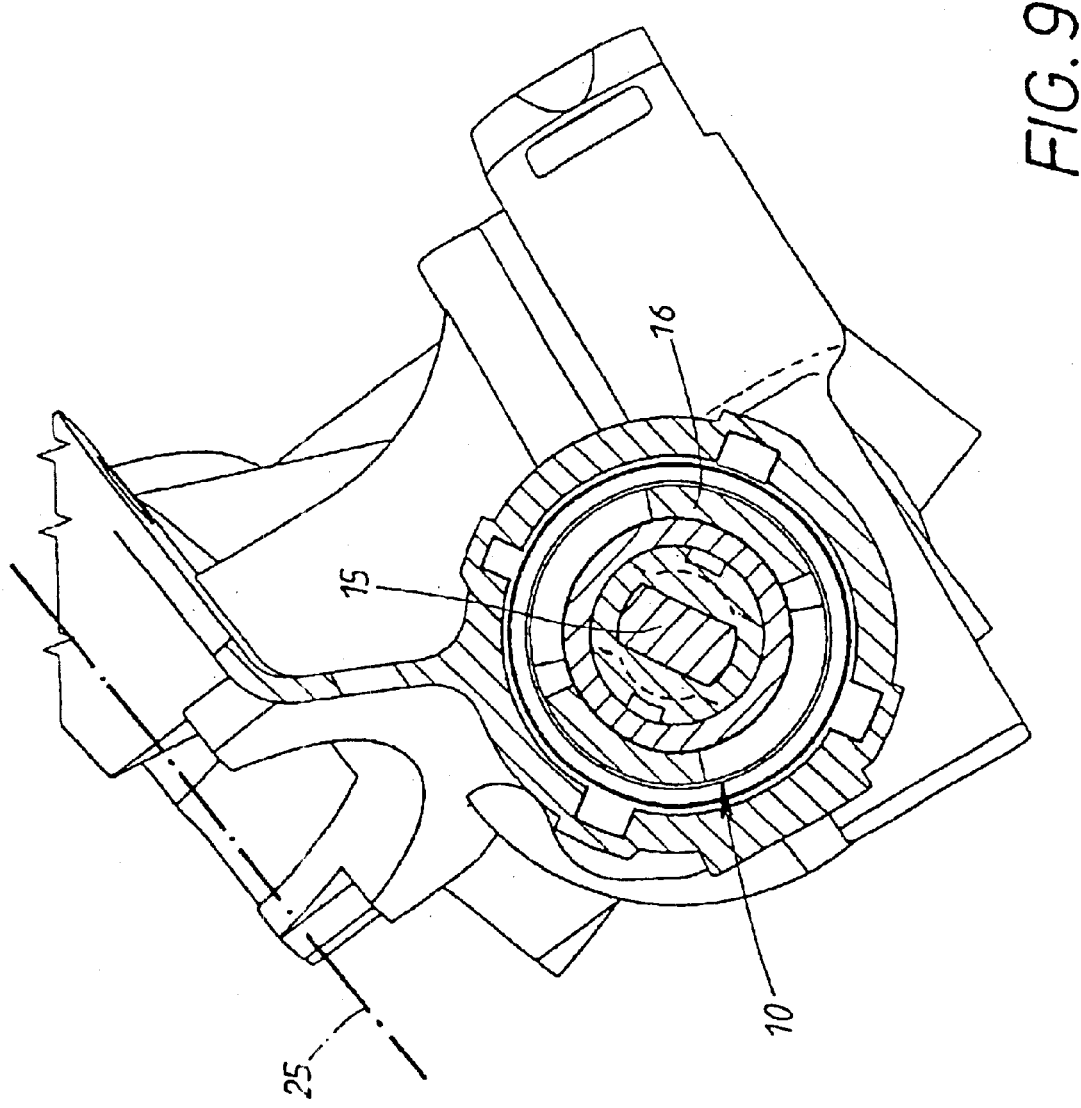

FIG. 4, in a view corresponding to FIG. 2, shows a cross section through the steering column lock shown in FIG. 3 along the cross-sectional line IV—IV in that figure;

FIG. 5, in a longitudinal cross section corresponding to FIG. 1, shows the intact steering column lock according to the invention after the inserted key has moved the rotor into a working position which corresponds to, for example, the "drive" position of the vehicle;

FIG. 6, in analogy to FIG. 2, shows another cross section through the steering column lock shown in FIG. 5 along the cross-sectional line VI—VI in that figure;

FIG. 7, in a view corresponding to FIG. 1, shows the steering column lock in a "delivery position", which allows authorized persons to install or to remove a selected rotor;

FIG. 8 shows a cross section through a steering column equipped with the steering column lock according to the invention, after this column has been blocked by the locking bar, which is in its locking position; and FIG. 9 shows a cross section through the steering column lock shown in FIG. 8 along the cross-sectional line VIII—VIII indicated in that figure.

As can best be seen in the cross-sectional view of FIG. 8, the steering column lock comprises a rotor 10 in a housing 11. When activated by the proper access authorization means, the rotor can be turned between different positions, one of which, namely, a "home position" 10.1, can be seen in FIG. 1, whereas the other position 10.2, namely a "working position", can be seen in FIG. 5. A control cam 12, which has not only the radial profile visible in FIG. 2 but also an axial division into a cam collar 13 and a cam sleeve 14, is aligned axially with the rotor 10 and is nonrotatably attached to it. All of these components are referred to together below as the "control cam". At the front end of the profiled cam sleeve 14, a control disk 16 is seated in the housing; this disk moves the control cam 12 in the axial direction when the rotor 10 rotates, as indicated by the rotational arrow 17. This axial movement is coordinated with the home position 10.1 and the working position 10.2 of the rotor. In the home position 10.1, the control cam 12 is in the longitudinal starting position, illustrated by the auxiliary line 12.1 in FIG. 1. When the rotor is rotated 17, the profile on the control disk 16 has the effect of moving the control cam 12 against the action of a restoring spring 18, which tries to hold the cam in the starting position 12.1, into the longitudinal ending position 12.2 shown in FIG. 5, which is characterized in FIG. 5 by the corresponding auxiliary line 12.2. The stroke distance 19 between the two longitudinal positions 12.1 and 12.2 is indicated in FIGS. 1 and 5.

An important function of the steering column lock is, when the vehicle is parked and unmoving, to block the steering column 25, shown in FIG. 8. For this purpose, a locking bar 20 is used, the end 21 of which in this case travels into one of the locking openings 26, which are provided in a nonrotatable ring 27 mounted on the steering column 25. The locking bar 20 is free to slide longitudinally in the housing 11 in the direction of the double arrow 24 of FIG. 8 and is acted upon by the force of a compression spring 28, which tries to keep it in the locking position, characterized in that figure by the auxiliary line 20.1.

The locking bar 20 is seated on a slider 22, which is free to move along with the bar; part of the slider is also visible in FIGS. 1 and 2. In FIG. 2, the auxiliary line 20.1 for the locking position on the slider 22 is also drawn in. In FIG. 2, the rotational position of the control cam 12 belonging to the locking position 20.1 of the slider 22 is illustrated by an auxiliary line 10.2, which is determined by the working position of the rotor 10. As FIG. 1 shows, an overload joint 29 is provided between the sleeve 14 of the control cam 12 and the control disk 16. When an attempt is made to rotate the rotor 10 forcibly with lock-breaking tools instead of by the use of the correct access authorization means, the overload joint 29 releases the connection between the control cam 12 and the driver end of the rotor 10.

In the present case, the rotor 10 is designed as a lock cylinder, which is coded mechanically, by tumblers, and which has a key 28 assigned specifically to it. This key 28 has the corresponding code, which, in the present mechanical case, consists of notches in the shaft of the key arranged in correspondence with the tumblers in the lock cylinder 10. It is obvious that any other known electrical or electronic access authorization system could be used instead of a lock cylinder and a key 28. The key 28 can be inserted only when the rotor is in the home position 10.1. As a result of a key-actuated rotation 18 to the working position 10.2, the control cam 12 is moved into the corresponding rotational position illustrated by the auxiliary line 10.2 in FIG. 6, as a result of which the slider 22 is moved against the action of a compression spring 23 into a position illustrated by the auxiliary line 20.2 in FIG. 6. In this position 20.2, the locking end 21 as shown in FIG. 8 is pulled out of the locking opening 26 in the steering column 25; the steering column 25 is released. The position 20.2 thus turns out to be the releasing position of the locking bar 20 and is also illustrated in dash-dot line in FIG. 8.

In the rear area, designated 35, of the housing 11, electrical or electronic switches can be provided, which are rotated concomitantly with the rotation 17 of the rotor and switch the associated motor and the other electrical or electronic devices in the vehicle into various positions. One of these positions is the "drive" position of the vehicle, which in the present case characterizes the working position 10.2 of FIGS. 5 and 6.

Unauthorized persons who do not have the correct access authorization means, that is, in the present case, those who do not have the previously mentioned correct key 28, could make the attempt to make the parked vehicle steerable by tearing out the rotor 10 in order to create access to the space 36 in the housing 11, as can be seen in FIG. 3. This unauthorized person could then attempt to "trick" the overload joint 29 by exerting a rotation directly on the control cam 12, with the goal of moving the locking bar 20 out of its locking position 10.1 of FIGS. 2 and 8 into its releasing position 20.2. This is not possible according to the invention, however, for the following reason.

As FIGS. 1 and 2 make clear, a blind hole 32, in which a locking pin 30 is held with freedom of longitudinal movement, is present in the control cam 12. At the base of the blind hole 32 there is a compression spring 34, which exerts a force 31 on the locking pin 30. The pin is thus spring-loaded 31 in the outward direction. In the normal case, the locking pin 30 is held in the retracted position 30.1 shown in FIGS. 1 and 2, in which it does not project out of the opening 37 of the blind hole 32. In the home position of the rotor, which is in the previously mentioned rotational position of FIG. 2 indicated by the auxiliary line 10.1, the locking end 33 of the locking pin 30 is aligned with a locking recess 38 provided in the housing 11.

The retracted position 30.1 of the locking pin 30 is maintained by a spring-loaded sensor element, which in the present case consists of a sensor pin 40. As can be seen FIG. 1, the sensor pin 40 is held in a bore 44, which is parallel to the cam-rotor axis 50 indicated in dash-dot line in FIG. 1 or, as in the present case, is concentric to this axis 50. One end 41 of the sensor pin holds the locking pin 30 in its retracted position 30.1. For this purpose, the locking pin 30 has a recess 39, best seen in FIG. 4, in which this "retaining end" 41 of the sensor pin 40 engages and thus renders the spring-loading 31 of the locking pin 30 ineffective.

This changes, however, when the rotor is torn out by an unauthorized person as shown in FIG. 3. The other end 42 of the sensor pin 40 now travels into the empty space 36 in the housing 11. The sensor pin 40 is being acted upon by the force of a compression spring 45, one end of which is supported against a collar 43, while the other end rests against a shoulder 46 inside the control cam 12. In the previous state, while the rotor 10 was still in place, this second end 42 of the sensor pin 40 was supported against a surface 15 of the rotor 10. In that situation, the compression spring 45 was pretensioned, but the engagement between the retaining end 41 and the locking pin 30 was secured. This end 42 of the sensor pin 40 thus turns out to be the "sensing" end, which establishes whether or not the rotor 10 is present in the housing 11.

After the rotor has been torn out as in FIG. 3, the retaining end 41 of the sensor pin 40 is pulled out of the recess 39 in the locking pin 30. The elastic force acting on the sensor pin 40 illustrated by the force arrow 47 can now have its effect, because the sensing end 42 is now freely exposed. The locking end 33 of the released locking pin 30 now travels into the locking recess 38 in the housing, as can be seen in FIG. 3, as a result of the force of the spring-loading 31 shown in FIG. 1. Now the locking pin 30 is in the extended position indicated by auxiliary line 30.2 in FIGS. 3 and 4. The rotation of the control cam 12 is blocked. Attempts to force it to rotate have no effect. The locking bar 20 remains, as shown in FIG. 4, in its locking position 20.1, the same position as that already shown in FIG. 2. The components 30, 40 thus turn out to function as a highly effective "anti-theft device" for the steering column lock according to the invention.

Without any danger to the functionality of the previously mentioned means for preventing the lock from being broken open, it is nevertheless easy for an authorized person to install or to remove the rotor 10. For this purpose, the invention makes use of the previously described working position 10.2 of the control cam 12 according to FIGS. 5 and 6. As already described above, the rotational position designated by the line 10.2 and at the same time the longitudinal ending position of the control cam 12 designated 12.2 in FIG. 2 are present. According to FIG. 6, the locking end 33 of the locking pin 30 is now offset both rotationally and longitudinally with respect to the locking recess 38 and instead faces an inside surface 48 of the housing.

This position, which can be achieved only by the use of the access authorization means, is used in the invention as the "delivery" position of the unit comprising the steering column lock shown in FIG. 7, this unit being completely prefabricated except for the rotor 10. FIG. 7 therefore shows a preliminary steering column lock product 49, which can be produced in mass quantities by the manufacturer without coding. Because, in this preliminary product 49, the housing space 36 does not yet hold the rotor 10, the sensor end 42 of the sensor pin 40 arrives in the same "let-go" position designated 40.2 as that described in the broken-open case of FIG. 3. The retaining end 41 of the sensor pin 40 has therefore also let go of the locking pin 30 in the case of the preliminary product also, for which reason it would be possible in principle for the previously mentioned spring-loading 31 of FIG. 7 to act on it. This cannot happen, however, because, as previously mentioned, a radial and possibly also axial offset of the locking end 33 according to FIG. 6 is present. The relationships of FIG. 7 differ from those of FIG. 6 only in that the sensor pin 40 shown there in cross section has been moved out of engagement with the locking pin 30, and therefore the retaining position 40.1 of the sensor pin 40 associated with FIG. 6 is no longer present. Although the locking pin 30 is disconnected, as shown in FIGS. 4 and 7, the locking end 33 of the pin is supported against the inside surface 48 of the housing, as FIG. 6 shows. For this reason, the locking pin 30 in the case of the preliminary product 49 of FIG. 7 remains in the original retracted position 30.1 shown in FIGS. 6 and 7. In the case of the preliminary product 49 of FIG. 7, it would be possible in and of itself for the cam 12 to rotate.

The preliminary product 49 is installed first in this way in the vehicle, and the delivery position described above is retained. It is only then, in the final assembly stage of the complete vehicle, that the rotor can be installed in the housing space 26 of the preliminary product 49 of FIG. 7. During this procedure, the front end 15 of the rotor comes up against the sensing end 42 of the sensor pin 40 and pushes it in the direction of the arrow 51 of FIG. 7 against he force of the compression spring 45 and thus back into the retaining position 40.1 of FIG. 5. This is possible, because the retaining end 41 of the sensor pin 40 according to FIG. 7 is axially aligned with the recess 39 in the locking pin 30; upon the restoring movement 51 of the sensor pin 40, therefore, the retaining end 41 travels easily into the recess 39. The relationships now present are again the same as those of FIG. 5. The preliminary product 49 has become the end product, to which a coded rotor 10 has been assigned in a specific manner.

In FIG. 5, the rotatable components of the end product are in the working position 10.2 described above. As a result of the insertion of a key 28 with the correct code for the installed rotor, the rotation 17 of the key is able to return the rotating parts according to FIGS. 1 and 2 back to their home position 10.1. The locking bar 20 now prevents the steering column 25 of the parked vehicle from being rotated, as desired. The removal of a rotor 10 that has become defective after a long period of service can be accomplished in an analogous manner by the insertion of the proper key 28 and rotation 17 of the rotor to the working position 10.2 of FIGS. 5 and 6. Then the rotor can be removed. The relationships described in conjunction with FIG. 7 are obtained, which are suitable for the easy installation of a new rotor.

In the present case, both the locking pin 30 and the sensor pin 40 have round cross sections. For this reason, the recess 39 can consist of a ring-shaped groove around the circumference, as shown in FIG. 7. This groove has a profile complementary to the round cross section of the sensor pin 40. In the retracted position 30.1 of the locking pin 30, the ring-shaped, groove-like recess 39 expands the bore 44 at the intersection with the blind hole 32 belonging to the locking pin 30, as FIG. 6 shows.

FIG. 9 shows a cross section through the rotor 10, which is designed here as a lock cylinder. It is possible to see the noncircular end part of the cylinder core belonging to the lock cylinder in the rotor 10. The end-of this cylinder core can serve as the support surface 15 for the sensor pin 40.

In the cross-sectional views in FIGS. 2, 4, and 6, a securing pin 52 with a round profile is also shown in cross section; this pin-belongs to a key anti-pullout device (not shown). When, via the inserted key 28, the rotor 10 has been returned from its working position 10.2 of FIG. 5 to its home position 10.1, the securing pin 52 grips under shoulders (not shown) inside the housing 11 as long as the key 28 still remains inserted in the rotor 10. As a result, by way of the activated securing pin 52, the slider 22 and the locking bar 20 seated therein remain in the releasing position 20.2 shown in FIG. 6, even though the control cam 12 has moved back into its original home position 10.1 of FIG. 2. Only after the key 28 has been pulled back out of the rotor 10 do the control elements release the securing pin 52. As the result of the elastic force acting on it, this pin then moves back into a position which releases the shoulders in the housing, as a result of which the slider 22 with the locking bar 20 can move away from the releasing position 20.2 of FIG. 6 and into the locking position 20.1 of FIG. 2 under the action of the compression spring 23.

List of Reference Numbers

| | |
|---|---|
| 10 | rotor |
| 10.1 | home position of 10 (FIGS. 1, 2) |
| 10.2 | working position of 10 (FIGS. 5, 6) |
| 11 | housing |
| 12 | control cam |
| 12.1 | longitudinal starting position of 12 (FIG. 1) |
| 12.2 | longitudinal ending position of 12 (FIG. 5) |
| 13 | cam collar (FIG. 1) |
| 14 | cam sleeve (FIG. 1) |
| 15 | support surface on 10 for 42, front end (FIG. 1) |
| 16 | control disk for 12 (FIGS. 1, 9) |
| 17 | rotational arrow for 10, key rotation, rotor rotation (FIGS. 1, 5) |
| 18 | restoring spring for 12 back to 12.1 (FIG. 1) |
| 19 | travel distance of 12 between 12.1 and 12.2 (FIGS. 1, 5) |
| 20 | locking bar |
| 20.1 | locking position of 20 (FIGS. 2, 4, 8) |
| 20.2 | releasing position of 20 (FIG. 6) |
| 21 | locking end of 20 (FIGS. 4, 8) |
| 22 | slider on 20 |
| 23 | compression spring for 20 (FIG. 8) |
| 24 | arrow of the longitudinal movement of 20 (FIG. 8) |
| 25 | steering column, column axis |
| 26 | locking opening in 27 (FIG. 8) |
| 27 | ring for 26 on 25 (FIG. 8) |
| 28 | access authorization means, key for 10 (FIG. 5) |
| 29 | overload joint between 10 and 12 (FIG. 1) |
| 30 | locking pin |
| 30.1 | retracted position of 30 (FIGS. 1, 2, 6) |
| 30.2 | extended position of 30 (FIGS. 3, 4) |
| 31 | arrow of the spring-loading of 30 |
| 32 | blind hole for 30 |
| 33 | locking end of 30 |
| 34 | compression spring for 30 |
| 35 | space for an ignition switch in 11 |
| 36 | housing space for 10 in 11 (FIGS. 3, 7) |
| 37 | opening of 32 (FIG. 2) |
| 38 | locking recess in 11 for 33 (FIGS. 1, 2) |
| 39 | recess in 30 for 41, ring-shaped groove (FIGS. 4, 6, 7) |
| 40 | sensor pin |
| 40.1 | retaining position of 40 (FIG. 5) |
| 40.2 | let-go position of 40 (FIGS. 3, 7) |
| 41 | retaining end of 40 for 30 (FIG. 1) |
| 42 | sensing end of 40 for 10 (FIG. 3) |
| 43 | collar on 40 for 45 (FIG. 3) |
| 44 | bore for 40 (FIG. 1) |
| 45 | compression spring for 40 (FIG. 3) |
| 46 | shoulder in 12 for 45 (FIG. 3) |
| 47 | arrow of the elastic force of 45 (FIG. 1) |
| 48 | inside surface of 11 for 33 (FIGS. 6, 7) |
| 49 | preliminary steering column lock product (FIG. 7) |
| 50 | cam-rotor axis (FIG. 1) |
| 51 | arrow of the return movement of 40 from 40.2 back to 40.1 (FIG. 7) |
| 52 | securing pin on 22 for 20 (FIGS. 2, 4, 6) |

What is claimed is:

1. Steering column lock for vehicles, with a rotor (10) supported in a stationary housing (11), which rotor can be rotated from its home position (10.1) into at least one working position (10.2) after being activated by access authorization means (28);

with a control cam (12) held in the housing (11), which cam rotates along with the rotor when the rotor is turned (17);

with a locking bar (20), which can be moved with respect to a steering column (25) by the control cam (12) between a locking position (20.1) and a releasing position (20.2); and with an anti-theft device (30, 40) for the lock, which has a spring-loaded locking pin (30);

wherein, in the normal case, the locking pin (30) is in a retracted position (30.1), in which a securing element grips a shoulder of the locking pin (30) and allows the locking bar (20) to change position, whereas, if the rotor (10) has been torn out, the securing element releases the locking pin (30), whereupon this pin, because of its spring-loading (31), moves into an extended position (30.2) and thus prevents the locking bar (20) from moving out of its locking position (20.1) and into the releasing position (20.2), wherein the locking pin (30) is integrated into the control cam (12) and can always rotate along with the rotation (17) of the rotor; in that the locking pin (30) is aligned with a locking recess (38) in the housing (11) when the rotor (10) is in the home position (10.1), but not when the rotor is in the working position (10.2); in that the securing element consists of a sensor element (40), spring-loaded (47) at one end, which element, after the rotor (10) has been installed, is supported (15) at least indirectly on the rotor (10) and holds the locking pin (30) in its retracted position (30.1); in that when the rotor (10) is not present, the sensor element, as a result of its spring loading (31), moves into the housing space (36) left free by the rotor (10) and thus releases the locking pin (30); and in that if the rotor (10) is in the home position (10.1), the released locking pin (30) travels into the locking recess (38) in the housing (11) and blocks its rotation, but, if the rotor (10) is in the working position (10.2), the pin is supported on an inside surface (48) of the housing and allows the control cam (12) to turn.

2. Steering column lock according to claim 1, wherein the locking pin (30) is seated in a radial blind hole (32); in that at the base of the blind hole (32) a compression spring (34) is installed, which is supported against the locking pin (30); and in that when the locking pin (30) is in its extended position (30.2), the locking end (33) projects out from the opening (37) of the blind hole (32).

3. Steering column lock according to claim 1, wherein the sensor element (40) is also integrated into the control cam (12) and can always rotate along with the rotation of the rotor.

4. Steering column lock according to claim 1, wherein the sensor element consists of a sensor pin (40), which is free to move in the longitudinal direction; in that the sensor pin (40) is installed in a bore (44), which is parallel to the rotational axis (50) of the control cam (12); in that one end of the sensor pin (40) is a sensing end (42), which is supported (15) on the rotor (10), whereas the other end is a retaining end (41), which normally holds the locking pin (30) in its retracted position (30.1).

5. Steering column lock according to claim 4, wherein the axially parallel bore (44) for the sensor pin (40) intersects the blind hole (32), which serves to accept the locking pin (30); and in that the locking pin (30) has a recess (39) for the sensor pin (40) in the area of the pin which is aligned with the profile of the axially parallel bore (44) for the sensor pin (40) when the locking pin (30) is in the retracted position (30.1).

6. Steering column lock according to claim 3, wherein the sensor pin (40) has a collar (43), against which one end of a compression spring (45) is supported, whereas the other end of the compression spring rests against a shoulder (46) in the control cam (12).

7. Steering column lock according to claim 4, wherein the bore (44) coincides with the rotational axis (50) of the control cam (12) and/or of the rotor (10).

8. Steering column lock according to claim 4, wherein the locking pin (30) and/or the sensor pin (40) has a round cross section.

9. Steering column lock according to claim 5, wherein the recess in the locking pin (30) consists of a circumferential ring-shaped groove (39), which has a profile complementary to the cross section of the sensor pin (40).

* * * * *